(12) United States Patent
Sheth et al.

(10) Patent No.: US 9,398,089 B2
(45) Date of Patent: Jul. 19, 2016

(54) DYNAMIC RESOURCE SHARING AMONG MULTIPLE WIRELESS DEVICES

(75) Inventors: Soham V. Sheth, San Diego, CA (US); Samir Soliman, San Diego, CA (US); Huey Trando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/333,145

(22) Filed: Dec. 11, 2008

(65) Prior Publication Data

US 2010/0153553 A1    Jun. 17, 2010

(51) Int. Cl.
| | | |
|---|---|---|
| *G06F 15/173* | (2006.01) | |
| *G06F 15/16* | (2006.01) | |
| *H04L 29/08* | (2006.01) | |

(52) U.S. Cl.
CPC .................................. *H04L 67/1095* (2013.01)

(58) Field of Classification Search
CPC ... G06F 9/5072; H04L 67/1095; H04L 67/16; G06Q 10/0631
USPC ........... 709/225–226, 229, 248; 707/999.008, 707/999.009, 999.201; 710/200
See application file for complete search history.

(56) References Cited

U.S. PATENT DOCUMENTS

| | | | |
|---|---|---|---|
| 4,791,554 A * | 12/1988 | Hirota et al. | |
| 5,828,370 A | 10/1998 | Moeller et al. | |
| 5,835,723 A | 11/1998 | Andrews et al. | |
| 5,925,137 A | 7/1999 | Okanoue et al. | |
| 6,014,706 A | 1/2000 | Cannon et al. | |
| 6,049,549 A | 4/2000 | Ganz et al. | |
| 6,195,680 B1 | 2/2001 | Goldszmidt et al. | |
| 6,252,889 B1 | 6/2001 | Patki et al. | |
| 6,266,690 B1 | 7/2001 | Shankarappa et al. | |
| 6,400,720 B1 | 6/2002 | Ovadia et al. | |
| 6,424,626 B1 | 7/2002 | Kidambi et al. | |
| 6,515,992 B1 | 2/2003 | Weston et al. | |

(Continued)

FOREIGN PATENT DOCUMENTS

| | | |
|---|---|---|
| CN | 1437355 A | 8/2003 |
| CN | 1561609 A | 1/2005 |

(Continued)

OTHER PUBLICATIONS

McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.*

(Continued)

*Primary Examiner* — Peling Shaw
(74) *Attorney, Agent, or Firm* — Ashish L. Patel; Charles E. Eggers

(57) ABSTRACT

A system and method that enables two or more hosts so that they can share a resource, such as a display. Client allocates a portion of the resource to each of the eligible hosts. This allocated size is negotiable among host(s) and the client. Client may request the hosts to scale down/up resource utilization based on the allocated portion of the resource being shared. This helps keep the client implementation simple. In this case, client maintains the allocation vector for each host. This allocation vector is used to keep track of the resource sharing. While this is a preferred approach, it is possible that "intelligent" client may actually modify resource utilization for a given host based on the negotiated allocation.

72 Claims, 4 Drawing Sheets

(56) References Cited

U.S. PATENT DOCUMENTS

| | | |
|---|---|---|
| 6,594,699 B1 | 7/2003 | Sahai et al. |
| 6,608,841 B1 | 8/2003 | Koodli |
| 6,748,195 B1 | 6/2004 | Phillips |
| 6,760,772 B2 | 7/2004 | Zou et al. |
| 6,801,530 B1 | 10/2004 | Brandt et al. |
| 6,876,857 B1 | 4/2005 | Nee et al. |
| 6,917,976 B1 | 7/2005 | Slaughter et al. |
| 6,963,921 B1 | 11/2005 | Yang et al. |
| 7,035,281 B1 | 4/2006 | Spearman et al. |
| 7,072,984 B1 | 7/2006 | Polonsky et al. |
| 7,080,151 B1 | 7/2006 | Borella et al. |
| 7,085,420 B2 | 8/2006 | Mehrotra |
| 7,324,462 B1 | 1/2008 | Page et al. |
| 7,328,021 B1 | 2/2008 | Satapathy |
| 7,333,464 B2 | 2/2008 | Yang et al. |
| 7,366,204 B2 | 4/2008 | Kang et al. |
| 7,373,415 B1 | 5/2008 | DeShan et al. |
| 7,376,155 B2 | 5/2008 | Ahn et al. |
| 7,477,659 B1 | 1/2009 | Nee et al. |
| 7,519,470 B2 | 4/2009 | Brasche et al. |
| 7,529,823 B2 | 5/2009 | Trufinescu et al. |
| 7,565,357 B2 | 7/2009 | Rao |
| 7,688,859 B2 | 3/2010 | Chen et al. |
| 7,696,980 B1 | 4/2010 | Piot et al. |
| 7,712,670 B2 | 5/2010 | Sauerwein, Jr. et al. |
| 7,716,385 B2 | 5/2010 | Saint-Hilaire et al. |
| 7,719,972 B2 | 5/2010 | Yuan et al. |
| 7,720,096 B2 | 5/2010 | Klemets |
| 7,768,536 B2 | 8/2010 | Hyatt |
| 7,835,406 B2 | 11/2010 | Oran et al. |
| 7,881,315 B2 | 2/2011 | Haveson et al. |
| 7,929,475 B2 | 4/2011 | Simonson et al. |
| 8,001,384 B2 | 8/2011 | Yamamoto et al. |
| 8,102,849 B2 | 1/2012 | Martinez Bauza et al. |
| 8,157,168 B2 | 4/2012 | Sauerwein, Jr. et al. |
| 8,364,201 B1 | 1/2013 | Fujisaki |
| 8,406,961 B2 | 3/2013 | Pathak et al. |
| 8,428,048 B2 | 4/2013 | Walker et al. |
| 8,437,347 B2 | 5/2013 | Casaccia et al. |
| 8,466,870 B2 | 6/2013 | Cohen et al. |
| 8,517,251 B2 | 8/2013 | Cohen et al. |
| 8,593,996 B2 | 11/2013 | Lee et al. |
| 8,605,048 B2 | 12/2013 | Ye et al. |
| 8,605,584 B2 | 12/2013 | Leung et al. |
| 8,612,619 B2 | 12/2013 | Guo et al. |
| 8,724,696 B2 | 5/2014 | Byford et al. |
| 8,966,131 B2 | 2/2015 | Huang et al. |
| 2002/0007494 A1 | 1/2002 | Hodge |
| 2002/0035621 A1 | 3/2002 | Zintel et al. |
| 2002/0097718 A1 | 7/2002 | Korus et al. |
| 2003/0031152 A1 | 2/2003 | Gohda et al. |
| 2003/0064752 A1 | 4/2003 | Adachi et al. |
| 2003/0110297 A1 | 6/2003 | Tabatabai et al. |
| 2003/0142631 A1 | 7/2003 | Silvester |
| 2003/0152098 A1 | 8/2003 | Zhu |
| 2003/0167171 A1 | 9/2003 | Calderone et al. |
| 2003/0225737 A1 | 12/2003 | Mathews |
| 2004/0039934 A1 | 2/2004 | Land et al. |
| 2004/0071169 A1 | 4/2004 | Abe et al. |
| 2004/0083284 A1 | 4/2004 | Ofek et al. |
| 2004/0103282 A1 | 5/2004 | Meier et al. |
| 2004/0147264 A1 | 7/2004 | Ogawa |
| 2004/0160967 A1 | 8/2004 | Fujita et al. |
| 2004/0202249 A1 | 10/2004 | Lo et al. |
| 2004/0214571 A1 | 10/2004 | Hong |
| 2005/0021810 A1 | 1/2005 | Umemura et al. |
| 2005/0044142 A1 | 2/2005 | Garrec et al. |
| 2005/0058090 A1 | 3/2005 | Chang et al. |
| 2005/0060750 A1 | 3/2005 | Oka et al. |
| 2005/0085239 A1 | 4/2005 | Cedervall |
| 2005/0096086 A1 | 5/2005 | Singamsetty |
| 2005/0102699 A1 | 5/2005 | Kim et al. |
| 2005/0111361 A1 | 5/2005 | Hosein |
| 2005/0130611 A1 | 6/2005 | Lu et al. |
| 2005/0136990 A1 | 6/2005 | Hardacker et al. |
| 2005/0138193 A1 | 6/2005 | Encarnacion et al. |
| 2005/0144225 A1 | 6/2005 | Anderson et al. |
| 2005/0149976 A1 | 7/2005 | Lupoi et al. |
| 2005/0152330 A1 | 7/2005 | Stephens et al. |
| 2005/0166241 A1 | 7/2005 | Kim et al. |
| 2005/0175321 A1 | 8/2005 | Aridome et al. |
| 2005/0176429 A1 | 8/2005 | Lee et al. |
| 2005/0184993 A1 | 8/2005 | Ludwin et al. |
| 2005/0198663 A1 | 9/2005 | Chaney et al. |
| 2005/0219266 A1 | 10/2005 | Koutani et al. |
| 2005/0266798 A1 | 12/2005 | Moloney et al. |
| 2005/0267946 A1 | 12/2005 | An et al. |
| 2006/0002320 A1 | 1/2006 | Costa-Requena et al. |
| 2006/0002395 A1 | 1/2006 | Araki et al. |
| 2006/0013182 A1 | 1/2006 | Balasubramanian et al. |
| 2006/0028398 A1 | 2/2006 | Willmore |
| 2006/0050640 A1 | 3/2006 | Jin et al. |
| 2006/0053459 A1 | 3/2006 | Simerly et al. |
| 2006/0058003 A1 | 3/2006 | Lee |
| 2006/0069797 A1 | 3/2006 | Abdo et al. |
| 2006/0098593 A1 | 5/2006 | Edvardsen et al. |
| 2006/0101146 A1 | 5/2006 | Wang |
| 2006/0103508 A1 | 5/2006 | Sato |
| 2006/0133414 A1 | 6/2006 | Luoma et al. |
| 2006/0136963 A1 | 6/2006 | Oh et al. |
| 2006/0146009 A1 | 7/2006 | Syrbe et al. |
| 2006/0187964 A1 | 8/2006 | Li et al. |
| 2006/0198448 A1 | 9/2006 | Aissi et al. |
| 2006/0199537 A1 | 9/2006 | Eisenbach |
| 2006/0202809 A1 | 9/2006 | Lane et al. |
| 2006/0203805 A1 | 9/2006 | Karacali-Akyamac et al. |
| 2006/0206340 A1 | 9/2006 | Silvera et al. |
| 2006/0209787 A1 | 9/2006 | Okuda |
| 2006/0218298 A1 | 9/2006 | Knapp et al. |
| 2006/0222246 A1 | 10/2006 | Murai et al. |
| 2006/0223442 A1 | 10/2006 | Stephens |
| 2006/0233191 A1 | 10/2006 | Pirzada et al. |
| 2006/0236250 A1 | 10/2006 | Gargi |
| 2006/0256851 A1 | 11/2006 | Wang et al. |
| 2006/0268869 A1 | 11/2006 | Boers et al. |
| 2006/0270417 A1 | 11/2006 | Chi |
| 2006/0288008 A1* | 12/2006 | Bhattiprolu et al. ............... 707/9 |
| 2007/0004387 A1 | 1/2007 | Gadamsetty et al. |
| 2007/0008922 A1 | 1/2007 | Abhishek et al. |
| 2007/0016654 A1 | 1/2007 | Bowles et al. |
| 2007/0022195 A1 | 1/2007 | Kawano et al. |
| 2007/0037600 A1 | 2/2007 | Fukuda |
| 2007/0043550 A1 | 2/2007 | Tzruya |
| 2007/0057865 A1 | 3/2007 | Song et al. |
| 2007/0057885 A1 | 3/2007 | Kurumisawa et al. |
| 2007/0061433 A1 | 3/2007 | Reynolds et al. |
| 2007/0104215 A1 | 5/2007 | Wang et al. |
| 2007/0126715 A1 | 6/2007 | Funamoto |
| 2007/0141984 A1 | 6/2007 | Kuehnel et al. |
| 2007/0141988 A1 | 6/2007 | Kuehnel et al. |
| 2007/0157283 A1 | 7/2007 | Setlur et al. |
| 2007/0162945 A1 | 7/2007 | Mills |
| 2007/0171910 A1 | 7/2007 | Kumar et al. |
| 2007/0182728 A1 | 8/2007 | Fujimori |
| 2007/0211041 A1 | 9/2007 | Lai et al. |
| 2007/0259662 A1 | 11/2007 | Lee et al. |
| 2007/0264988 A1 | 11/2007 | Wilson, Jr. et al. |
| 2007/0264991 A1 | 11/2007 | Jones et al. |
| 2007/0274400 A1 | 11/2007 | Murai et al. |
| 2007/0291636 A1 | 12/2007 | Rajagopal et al. |
| 2007/0292135 A1 | 12/2007 | Guo et al. |
| 2007/0299778 A1 | 12/2007 | Haveson et al. |
| 2008/0005348 A1 | 1/2008 | Kosiba et al. |
| 2008/0013658 A1 | 1/2008 | Lewis et al. |
| 2008/0018657 A1 | 1/2008 | Montag |
| 2008/0031210 A1 | 2/2008 | Abhishek et al. |
| 2008/0037506 A1 | 2/2008 | Dharmaraju et al. |
| 2008/0037785 A1 | 2/2008 | Gantman et al. |
| 2008/0045149 A1 | 2/2008 | Dharmaraju et al. |
| 2008/0046944 A1 | 2/2008 | Lee et al. |
| 2008/0109763 A1 | 5/2008 | Lee |
| 2008/0115183 A1 | 5/2008 | Zato et al. |
| 2008/0129879 A1 | 6/2008 | Shao et al. |
| 2008/0130612 A1 | 6/2008 | Gorokhov et al. |

(56) References Cited

U.S. PATENT DOCUMENTS

| | | |
|---|---|---|
| 2008/0155057 A1 | 6/2008 | Khedouri et al. |
| 2008/0198847 A1 | 8/2008 | Yamagishi et al. |
| 2008/0198848 A1 | 8/2008 | Yamagishi |
| 2008/0205394 A1 | 8/2008 | Deshpande et al. |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0083431 A1 | 3/2009 | Balachandran et al. |
| 2009/0089453 A1 | 4/2009 | Bohan et al. |
| 2009/0091656 A1 | 4/2009 | Kitaru et al. |
| 2009/0094317 A1 | 4/2009 | Venkitaraman |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0147139 A1 | 6/2009 | Watanabe et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1 | 12/2009 | Harter, Jr. et al. |
| 2009/0323562 A1 | 12/2009 | Cho et al. |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1 | 5/2010 | Gelman et al. |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1 | 10/2010 | Go et al. |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2010/0293287 A1 | 11/2010 | Kobayashi |
| 2010/0306344 A1 | 12/2010 | Athas et al. |
| 2011/0002255 A1 | 1/2011 | Dharmaraju et al. |
| 2011/0019620 A1 | 1/2011 | Wang |
| 2011/0037447 A1 | 2/2011 | Mair |
| 2011/0051602 A1 | 3/2011 | Matthews et al. |
| 2011/0069720 A1 | 3/2011 | Jacobs et al. |
| 2011/0072473 A1 | 3/2011 | Funabiki et al. |
| 2011/0107388 A1 | 5/2011 | Lee et al. |
| 2011/0115818 A1 | 5/2011 | Chung et al. |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |
| 2011/0164058 A1 | 7/2011 | Lemay |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0038825 A1 | 2/2012 | Kanonich |
| 2012/0044985 A1 | 2/2012 | Tao et al. |
| 2012/0060100 A1 | 3/2012 | Sherwood et al. |
| 2012/0084670 A1 | 4/2012 | Momchilov |
| 2012/0099566 A1 | 4/2012 | Laine et al. |
| 2012/0113113 A1 | 5/2012 | Hong |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0249575 A1 | 10/2012 | Krolczyk et al. |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0033496 A1 | 2/2013 | Raveendran et al. |
| 2013/0047189 A1 | 2/2013 | Raveendran et al. |
| 2013/0128948 A1 | 5/2013 | Rabii et al. |
| 2013/0139210 A1 | 5/2013 | Huang et al. |
| 2013/0174208 A1 | 7/2013 | Lee et al. |
| 2013/0188632 A1 | 7/2013 | Sheth et al. |
| 2013/0195119 A1 | 8/2013 | Huang et al. |
| 2013/0215142 A1 | 8/2013 | Park |
| 2013/0222301 A1 | 8/2013 | Lee et al. |
| 2013/0227152 A1 | 8/2013 | Lee et al. |
| 2013/0234913 A1 | 9/2013 | Thangadorai et al. |
| 2013/0238702 A1 | 9/2013 | Sheth et al. |
| 2013/0246565 A1 | 9/2013 | Froelicher et al. |
| 2013/0246665 A1 | 9/2013 | Lee et al. |
| 2013/0272628 A1 | 10/2013 | Lee |
| 2013/0297936 A1 | 11/2013 | Khosravi et al. |
| 2013/0304794 A1 | 11/2013 | Verma et al. |
| 2014/0019653 A1 | 1/2014 | Amchislavsky et al. |
| 2014/0022146 A1 | 1/2014 | Thangadorai et al. |
| 2014/0096164 A1 | 4/2014 | Bei et al. |
| 2014/0120829 A1 | 5/2014 | Bhamidipati et al. |
| 2014/0210693 A1 | 7/2014 | Bhamidipati et al. |
| 2014/0372620 A1 | 12/2014 | Vedula et al. |

FOREIGN PATENT DOCUMENTS

| | | |
|---|---|---|
| CN | 1592884 A | 3/2005 |
| CN | 1596004 A | 3/2005 |
| CN | 1656750 A | 8/2005 |
| CN | 1662944 A | 8/2005 |
| CN | 1774106 A | 5/2006 |
| CN | 1832481 A | 9/2006 |
| CN | 1893356 A | 1/2007 |
| CN | 1983945 A | 6/2007 |
| CN | 101002453 A | 7/2007 |
| CN | 101018330 A | 8/2007 |
| CN | 101083825 A | 12/2007 |
| CN | 101247249 A | 8/2008 |
| CN | 101247250 A | 8/2008 |
| EP | 1206080 A1 | 5/2002 |
| EP | 1233326 A2 | 8/2002 |
| EP | 1235392 A1 | 8/2002 |
| EP | 1325591 A1 | 7/2003 |
| EP | 1333373 A1 | 8/2003 |
| EP | 1385336 A2 | 1/2004 |
| EP | 1423778 A2 | 6/2004 |
| EP | 1507369 A1 | 2/2005 |
| EP | 1517228 A2 | 3/2005 |
| EP | 1550264 A1 | 7/2005 |
| EP | 1653678 A2 | 5/2006 |

(56) References Cited

FOREIGN PATENT DOCUMENTS

| | | |
|---|---|---|
| EP | 1944946 | 7/2008 |
| EP | 1959685 A2 | 8/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H07240806 A | 9/1995 |
| JP | H08237628 A | 9/1996 |
| JP | H09325923 A | 12/1997 |
| JP | 2000278320 A | 10/2000 |
| JP | 2000354031 A | 12/2000 |
| JP | 2001034250 A | 2/2001 |
| JP | 2001282673 A | 10/2001 |
| JP | 2001352533 A | 12/2001 |
| JP | 2002064725 A | 2/2002 |
| JP | 2002142210 A | 5/2002 |
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003124991 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060448 A | 3/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 A | 1/2009 |
| JP | 2009033348 A | 2/2009 |
| JP | 2009071580 A | 4/2009 |
| JP | 2009083896 A | 4/2009 |
| JP | 2009147893 A | 7/2009 |
| JP | 2009537051 A | 10/2009 |
| JP | 2010033548 A | 2/2010 |
| JP | 2010068537 A | 3/2010 |
| JP | 2010098344 A | 4/2010 |
| JP | 2010178147 A | 8/2010 |
| JP | 2012044746 A | 3/2012 |
| JP | 2012525773 A | 10/2012 |
| JP | 2014507862 A | 3/2014 |
| KR | 100398610 B1 | 9/2003 |
| KR | 1020050007533 | 1/2005 |
| KR | 20060060717 A | 6/2006 |
| RU | 2207723 C1 | 6/2003 |
| RU | 2005113275 A | 10/2005 |
| RU | 2269873 C2 | 2/2006 |
| TW | 496058 | 7/2002 |
| TW | I234954 | 6/2005 |
| TW | I239179 | 9/2005 |
| TW | 200618653 | 6/2006 |
| TW | 200838310 A | 9/2008 |
| TW | 200943168 A | 10/2009 |
| WO | WO0184291 A1 | 11/2001 |
| WO | WO02010942 | 2/2002 |
| WO | 0223825 A1 | 3/2002 |
| WO | WO0249314 A2 | 6/2002 |
| WO | 03030451 A1 | 4/2003 |
| WO | 03061240 A1 | 7/2003 |
| WO | 03104834 A2 | 12/2003 |
| WO | 2004030351 A1 | 4/2004 |
| WO | 2004034646 A1 | 4/2004 |
| WO | 2004051962 A1 | 6/2004 |
| WO | 2005107187 A1 | 11/2005 |
| WO | 2005109781 A1 | 11/2005 |
| WO | WO2005122509 | 12/2005 |
| WO | 2006007352 A1 | 1/2006 |
| WO | 2006020304 A2 | 2/2006 |
| WO | WO2006135289 A1 | 12/2006 |
| WO | 2007009876 A1 | 1/2007 |
| WO | WO2007000757 | 1/2007 |
| WO | 2007013334 A1 | 2/2007 |
| WO | WO2007021269 | 2/2007 |
| WO | 2007033049 A2 | 3/2007 |
| WO | 2007098425 A1 | 8/2007 |
| WO | 2007133483 A1 | 11/2007 |
| WO | 2008027724 A1 | 3/2008 |
| WO | 2008087713 A1 | 7/2008 |
| WO | 2009040918 A1 | 4/2009 |
| WO | 2010120878 A2 | 10/2010 |
| WO | 2010126727 A2 | 11/2010 |
| WO | 2011002141 A1 | 1/2011 |
| WO | 2011003089 A1 | 1/2011 |
| WO | 2012096546 A2 | 7/2012 |

OTHER PUBLICATIONS

Myers B.A. et al: "Collaboration using multiple PDAs connected to a PC," Proceedings of the ACM Conference on Computer Supported Cooperative Work (CSCW), Nov. 14, 1998. XP002351264.
International Search Report, PCT/US2009/067632. International Searching Authority—European Patent Office. Apr. 29, 2010.
Written Opinion of the International Searching Authority, PCT/US2009/067632. International Searching Authority—European Patent Office. Apr. 29, 2010.
Euihyeok Kwon, et al., "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ, USA, IEEE, Sep. 25.
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002. 997206, vol. 4, Apr. 28, 2002, pp. 2036-2042, XP010589844 ISBN: 978-0-7803-7400-3.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
Miller B., et al., "Mapping salutation architecture APIs to Bluetooth

(56) References Cited

OTHER PUBLICATIONS service discovery layer," Bluetooth White Paper, [Online} pp. 1-25, Jul. 1, 1999, XP002511956.
Nordbotten, N.A. et al., "Methods for service discovery in Bluetooth scatternets," Computer Communications, Elsevier Science Publishers BV, Amsterdam, NL, vol. 27, No. 11, Jul. 1, 2004, pp. 1087-1096, XP004503638.
Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.
Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.
Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
Brandenburg, et al., AVTCore, RTCP for inter-destination media syncronization, Internet Draft, draft-ietf-avtcore-idms-092.txt, Oct. 31, 2011.
Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012] the whole document.
Media Content Distribution (MCD); 3D 1-30 Gaming Graphics Delivery Overview, Technical Report, European Telecommunications Standards Institute (ETSI), 650, Route Des Lucioles; F-06921 Sophia-Antipolis; France, vol. MCD, No. V1. 1. 1, Dec. 1, 2010, XP014061814, section 5.
Mihai Mitrea et al: "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11), No. M16058, Jan. 29, 2009, XP030044655, sections 2 and 3.
MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/ms740673(VS.85).aspx.
Nave I et al., "Games@large graphics streaming architecture", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.
Schulzrinne, et al., "RTP: A Transport Protocol for Real-Time Applications", rfc3550.txt, Jul. 1, 2003, XP015009332, ISSN: 0000-0003.
Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.
Wenger et al., "RTP Payload Format for H.264 Video," Network Working Group, RFC 3984, Feb. 2005, 78 pp.
Co-pending U.S. Appl. No. 10/236,657, filed Sep. 6, 2002.
Video Electronics Standards Association (VESA) "Mobile Display Digital Interface Standard (MDDI)," Jul. 2004.
"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
Byungjoo Lee, U.S. Appl. No. 61/433,942, filed Jan. 18, 2011.
Casner, S., et al., "Compressing IP/UDP/RTP Headers for Low-Speed Serial Links," IETF Network Working Group, RFC 2508 (Feb. 1999).
Gentric., et al., "RTP Payload Format for MPEG-4 Streams", Internet Engineering Task Force, draft-ietf-avt-mpeg4-multisl-03.txt, Nov. 2001, pp. 13,14,25 and 33.
Handley, M. et al., "SDP: Session Description Protocol" Network Working Group, Request for Comments: 2327, Category: Standards Track. ISI/LBNL, Apr. 1998, pp. 1-42.
DDJ., "Research on Windows Programming with Visual C++, Final Issue, Overcoming WIN32 Hook Processing in MFC Programming", Feb. 1996 issue (vol. 5, No. 2, No. 61 in all), Shoeisha Co., Ltd., Feb. 1, 1996, pp. 66-77.
International Preliminary Report on Patentability—PCT/US2013/020155, The International Bureau of WIPO—Geneva, Switzerland, Jul. 17, 2014.
Wikipedia entry for UPnP List of UPnP AV media servers and clients (captured Aug. 20, 2010), pp. 1-10, Retrieved from the Internet < URL: web.archive.org/web/20100820133238/http://en.wikipedia.org/wiki/List_of_UPnP_AV_media_servers_and_clients >, whole document.
Wikipedia entry of header (captured Aug. 30, 2010), 1 Page, Retrieved from the Internet < URL: web.archive.org/web/20100830154156/http://en.wikipedia.org/wiki/Header_(computing) >, whole document.
"Raster Graphics" Wikipedia. Wikimedia Foundation, Jan. 29, 2011, Web, Apr. 1, 2015.
Hayakawa A., "Operate multiple machines by remote control software", VNCThing, MAC POWER, Japan, ASCII Corporation, Jun. 1, 2003, vol. 14, No. 6, p. 86.
Kinoshita K., "The Software" Everyone knows, Read this and everything will be clear, Standard software with freedom., Mac Fan, Japan, Mainichi Communications Inc., Sep. 1, 2007, vol. 15, No. 9, pp. 212-219.
Ryo Yamaich I, Good to Remember! "Wisdom" for Troubleshooting, 68th Windows Q & A Hotline, Windows Server World, Japan, IDG Japan, Inc., Oct. 1, 2009, vol. 14, No. 10, pp. 104-107.

\* cited by examiner

DYNAMIC RESOURCE SHARING AMONG MULTIPLE WIRELESS DEVICES

REFERENCE TO CO-PENDING APPLICATIONS FOR PATENT

The present Application for Patent is related to the following U.S. patent applications:

"Wireless Architecture for a Traditional Wire-Based Protocol", U.S. patent application Ser. No. 12/179,411, filed Jul. 24, 2008, which claims priority to "Wireless Architecture for a Traditional Wire-Based Protocol", U.S. Provisional Patent Application Ser. No. 60/951,919 filed Jul. 25, 2007; and "Apparatus and Methods for Establishing Client-Host Associations Within a Wireless Network", U.S. patent application Ser. No. 12/098,025, filed Apr. 4, 2008.

BACKGROUND

1. Field

The presently claimed invention relates to ad-hoc networks, and more specifically to dynamically sharing resources as hosts enter and leave the network, and a system for negotiation and allocation of resources among hosts.

2. Background

When a wireless device needs to access a resource or service provided by another wireless device, they need to pair up and establish dedicated ad-hoc service between them. With the increased use of wireless ad-hoc networks, it is desirable to have the ability to share such resource and/or service provided by one client among multiple ad-hoc hosts.

At present, a solution is available where a wireless host can copy the data to a remote hard disk after establishing a wireless ad-hoc network. However, it is desirable that two or more users can archive their data from their portable devices to the same hard disk simultaneously. The presently claimed invention provides a solution by making a remote hard disk "just intelligent enough" so multiple users can share its memory.

There are proposals that would allow a wireless host to access the remote screen and render its own images onto this bigger remote screen. However, it is desirable that two or more hosts can setup the ad-hoc network and share the remote display. With the claimed invention, they can negotiate the amount of sharing, and coordinate their sharing.

Another classic example is some TV sets support picture-in-picture where multiple channels share the display area. However, a lot of "intelligence" is required inside the TV set. The TV set can only handle a fixed number of sources. Also, the sharing of display regions is fixed. This proposal enables simple clients to share the display by controlling the images' resolution sent by the ad-hoc hosts, dynamically. It also allows as many hosts as possible to access the resources in an ad-hoc manner. The resource allocation is flexible based on the negotiation among the hosts.

SUMMARY

Aspects disclosed herein address the above stated needs by a method, system, and computer program product for dynamically sharing a client resource among two or more hosts. The client allocates a portion of the resource, such as a portion of a display, to each of the hosts. This allocation can be negotiated between the hosts and the client. The client can request one or more hosts to scale up or down the use of resource. For example, the client can command that two or more hosts scale down the image area being used by each host to fill the maximum total display area. An allocation vector is maintained by the client for each host. This allocation vector is used to track the resource sharing amongst the hosts. Alternately, a client can dynamically scale the resource usage based on the allocated portion of the resource.

DETAILED DESCRIPTION

The word "exemplary" is used herein to mean "serving as an example, instance, or illustration." Any aspect described herein as "exemplary" is not necessarily to be construed as preferred or advantageous over other aspects.

Aspects disclosed herein address the above stated problem by providing a system for product for dynamically sharing a client resource among two or more hosts. Wireless devices/equipments interact amongst each other within a wireless network. Often, a wireless device (host) accesses one or more service(s) from another wireless device (client). In order to access and monitor the service(s), the host or the client initiates an association. This way, the host and the client establish a temporary wireless association between them. During the period of the association, the host exclusively uses the service (e.g., display) provided by the client. However, at times, it is desirable to have the ability to share the client resource (e.g., display) among multiple host devices.

Figure 1:
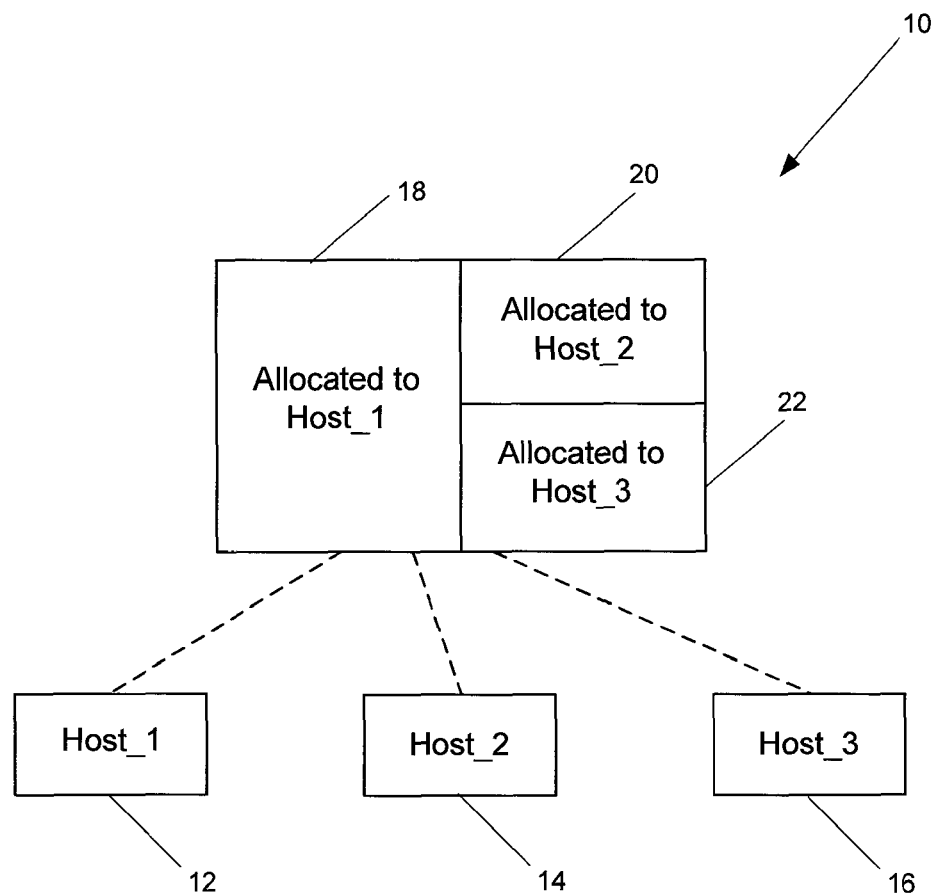
FIG. 1 shows an exemplary allocation of client resources.

The claimed invention enables two or more hosts so that they can share a client resource, such as a display as shown in FIG. 1. Client 10 allocates a portion of the resource (e.g., a fraction of display) to each of the eligible hosts 12, 14, and 16. As shown in the exemplary aspect in FIG. 1, Host_1 12 is allocated fifty percent (50%) of client resources 18, Host_2 14 is allocated twenty five percent (25%) of client resources 20 and Host_3 16 is allocated the remaining twenty five percent (25%) of client resources 22. The following is merely an example, thus the allocation can include more or less hosts and an infinite number of percentages of allocations. This allocated size is negotiable among host(s) 12, 14 and 16 and client 10. Client 10 may request hosts 12, 14, and 16, to scale down/up size of the image(s) being sent based on the allocated size of the display area being shared. This helps keep the client implementation simple. In this case, client 10 maintains an allocation vector for each host. This allocation vector is used to render the image at the allocated area. While this is a preferred approach, an optional system provides an "intelligent" client 10 that can scale down/up incoming image(s) based on the size of the allocated area for the image.

Hosts 12, 14, and 16 can specify "share-mode" at the time of establishing an association with client 10. The "share-mode" can include, but is not limited to following the modes:

Exclusive use—This mode implies that the host does not wish to share the resource with other hosts. In this case, client rejects any new request to share the resource including "exclusive use" request.

For example, if a client is in "exclusive use" association with a host, it will reject any type of share request from another host. In addition, if a client is in "non-exclusive use" association with a host, it will reject any request with "exclusive use" because the client is already in use.

Time Sliced Primary Tenant (TSPT)—In this mode, the TSPT exclusively uses the client resource(s). However, when Time Sliced Secondary Tenants (TSST) request permission to use the client resource(s), TSPT may grant the permission so that TSST can use the client resource(s) exclusively for the time being. However, TSPT can seize the client resources any time or when the TSST relinquishes the permission to use the client resource(s). Preferably, this mode should be used in Owner-Tenant fashioned cluster, as described below.

Primary Tenant—This mode implies that this host is the primary tenant. Hence, by default, it will consume a significant portion of the resource.

Time Sliced Secondary Tenants (TSST)—In this mode, TSST acquires the permission to exclusively use the client resources from the TSPT. However, it may have to relinquish the permission at the will of TSPT. As with TSPT, this mode should be used in Owner-Tenant fashioned cluster.

Secondary Tenant—This mode implies that this host would use a smaller portion of the resource, whereas a significant portion of the display area/resource will be occupied by the primary tenant. The secondary tenant can request to become primary tenant. Client may or may not grant it depending upon permission granted by the current primary tenant.

Equal Share Tenant—This mode implies that client will make sure to allocate equal amounts of the resource to each of the sharing hosts.

In another aspect, a host provides the resource sharing preferences to the client. Hosts may specify their preferences while requesting an association or negotiate it at anytime during the life of the association. If possible, client would accept the preferences as requested. Otherwise, hosts can negotiate the preferences with the client at a later time. These preferences include but are not limited to the following scenarios.

Preferred Portion—A host can specify a particular portion of the resource (e.g., a particular portion of a display surface) it desires to use. If there is no conflict, client grants the preference. However, if there is a conflict, client may negotiate the allocation with the current tenant (e.g., host currently using the specified location).

This sharing cluster may be established in "owner-tenant" or "all-tenant" fashion.

Owner-Tenant—In this case, a host becomes owner of the resource based on the predefined criteria (e.g., first host to establish the association with the client). Any other hosts sharing the resource are considered tenants. If the client receives requests to share the resource from other hosts, it would get the permission from the owner only, regardless of the number of tenants sharing the resource. If the current owner leaves the association, it transfers the ownership to another host using the predefined procedure using a wireless association ownership handover using any type of handover system, such as the one described in "Apparatus and Methods for Establishing Client-Host Associations Within a Wireless Network", U.S. patent application Ser. No. 12/098,025, filed Apr. 4, 2008.

All-Tenant—In this case, all the hosts sharing the device are considered tenants. If client receives another request to share the resource, it seeks the permission from all the active tenants (e.g., currently sharing the resource).

If one or more host(s), sharing the resource, leave(s) the shared cluster, client would recoup the resource occupied by the leaving host and rebalance the sharing among active hosts. Client also notifies the respective updated share information to each of the active hosts. Accordingly, host(s) may scale up/down their resource usage.

In another aspect, if client reaches a specified limit on the number of owner and/or tenants, it may reject any new requests to share the resource. While this is a preferred method, it is possible that client may choose to drop sharing with an existing host in favor of a new request based on the predefined criteria (e.g., sharing priority).

In one more aspect, a qualifying host based on predefined criteria (e.g., owner or highest priority), may request to access entire resource. In this event, the client may drop the rest of the host(s) from sharing the resource.

While the above description assumes that the sharing events are brokered through the client, it is possible that hosts can negotiate sharing among themselves.

Figure 2:
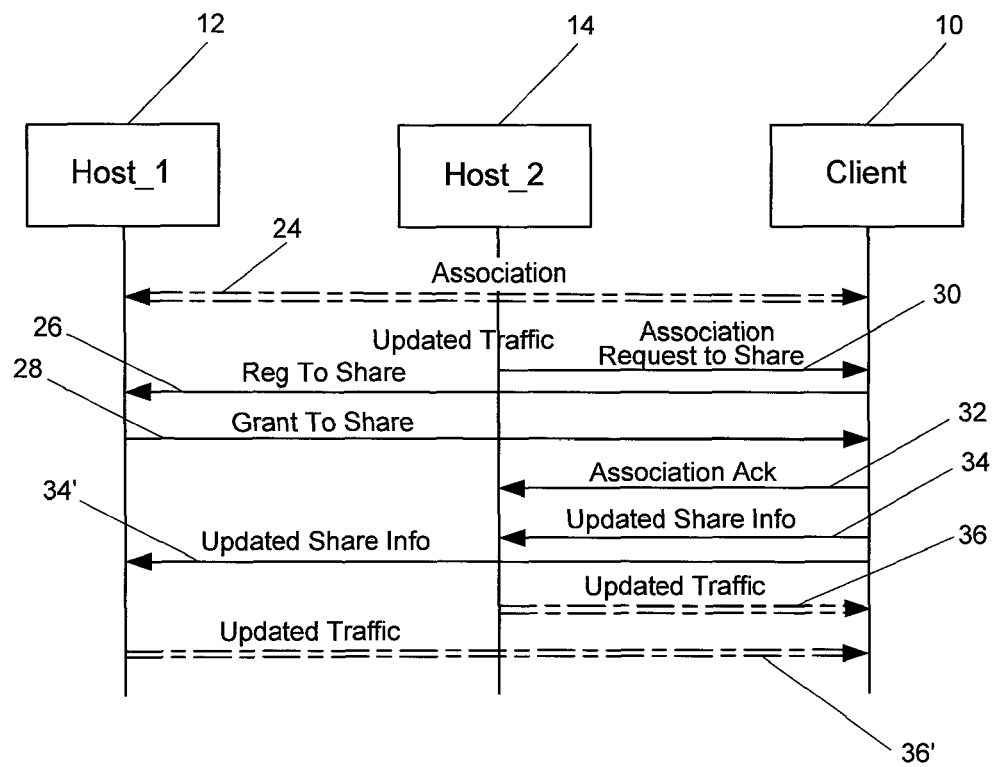
FIG. 2 describes the establishment of a shared session.

Operation—The operation of the claimed invention is described by the following examples. Although these examples only describe two hosts, it is anticipated that the system operates similarly with any number of hosts, and these exemplary aspects are meant for simple explanation of the system and not a limitation. The implementation of the claimed invention requires that a shared session be established and is depicted in FIG. 2. Initially, an association 24 exists between Host_1 12 and a client 10. An association request 30 can be made by another host, such as Host_2 14. Host_2 14 specifies one of the share-modes in a request to share, as specified above. Client 10 may accept (or reject) the request depending upon the type of the specified share-mode and whether there are any other hosts using the client 10 resource. When Host_2 14, requests to share the client resource while sending the association request to share 30, client seeks the permission 26 from the current owner (or all tenants), in this case Host_1 12, to allow the entry. If current owner (or all tenants) grant(s) the permission, client 10 accepts the association request with grant to share-mode 28 and provides an acknowledgment of the association 32. Client updates and sends the sharing information 34 and 34' (e.g., size, location of the shared area, instruction to scale down/up resource usage) to Host_1 12 including the new one, Host_2 14. Upon acceptance, new Host_2 14 and existing Host_1 12 make the necessary changes (e.g., scales down the resource consumption) and start/continue using the client services using updated traffic mode 36 and 36'.

Figure 3:
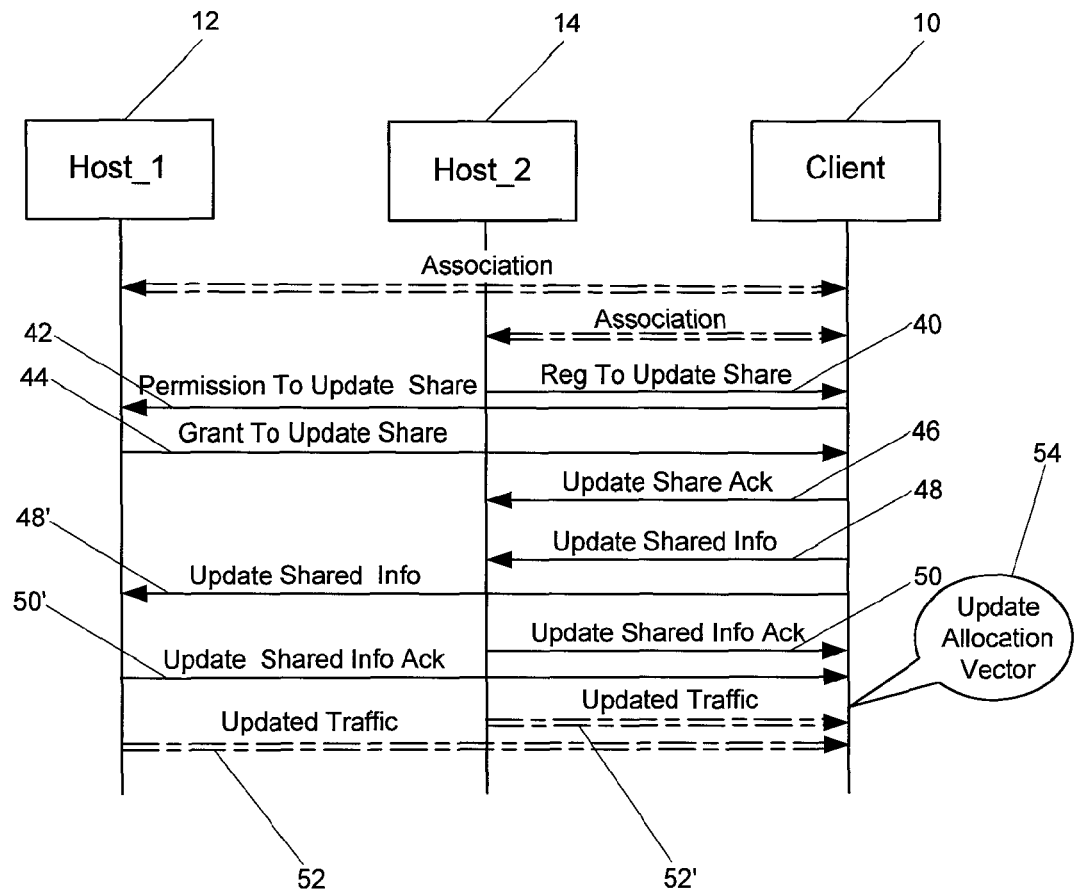
FIG. 3 describes the negotiation of the shared allocation.

The negotiation of the allocation of the client 10 resources is shown in FIG. 3. When one of the hosts, in this case Host_2 14, is already engaged in association with client 10 and wants to change the sharing of the client resource (e.g., display), Host_2 14 sends a "ReqToUpdateShare" 40 to client 10. Client 10 seeks permission to update share 42 from the other host(s) (e.g., owner or all tenants), in this case Host_1 12, for the change in share. If the other host(s), Host_1 12, grants the permission 44, client 10 acknowledges the "ReqToUpdateShare" by sending Ack 46 to Host_2 14. Client 10 also sends the updated sharing information to all the hosts having active association with the client using "UpdateSharedInfo" 48 and 48'. Client includes the necessary change request (e.g., scale down/up) in this message. When host(s), Host_1 12 and Host_2 14, receive the "UpdateSharedInfo" 48 and 48' message, they take necessary action and respond with "UpdateSharedInfoAck" 50 and 50' to client 10. Then, they start sending the updated traffic 52 and 52'. The "UpdateSharedInfo" 48 and 48' can also be activated at certain predetermined time intervals to insure the system is balanced.

Figure 4:
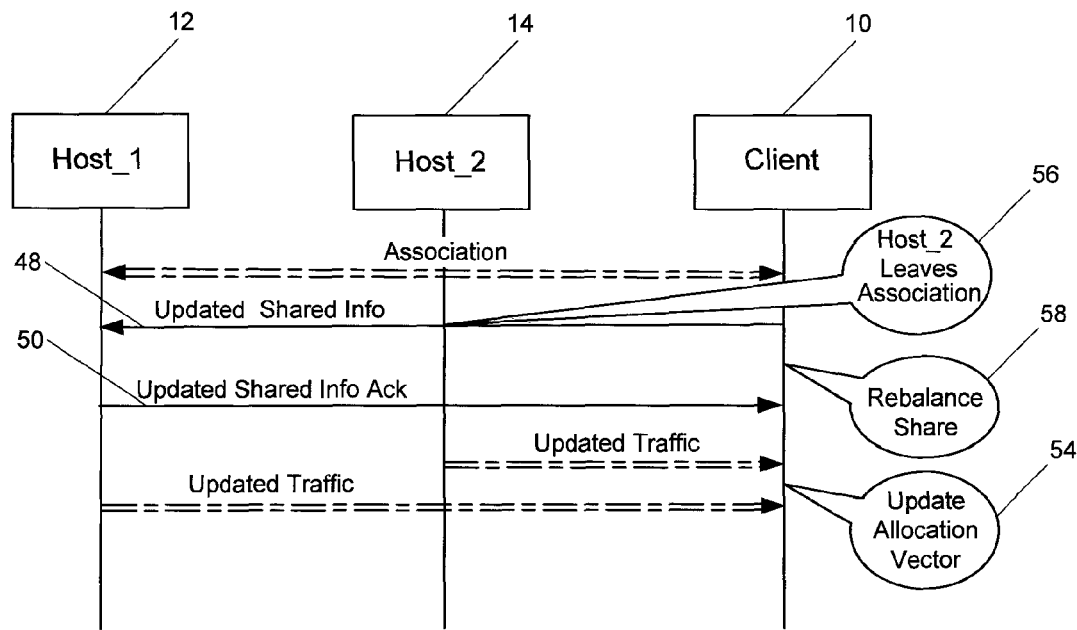
FIG. 4 shows how the allocated shares are rebalanced after a host departs the system.

FIG. 4 shows the system for rebalancing the allocated shares of client 10 resources. When client 10 receives the "UpdateSharedInfoAck" 50 and 50' of FIG. 3, it updates the allocation vector 54 and continues processing updated traffic 52 and 52' (e.g., displays images using new share). When Host_2 14 leaves the association 56, client 10 rebalances the resource allocation 58 amongst remaining hosts, in this case Host_1 12. It sends the "UpdateShareInfo" 48 signal to all the remaining hosts, in this case Host_1 12, as described in the description of FIG. 3. When Host_1 12 receives the "UpdateShareInfo" 48, it and client 10 make necessary changes as described in the negotiate allocation section of FIG. 3.

In an established ad-hoc network, if a host wants to modify its share mode, such as upgrading or downgrading to higher privilege mode (e.g. secondary tenant to primary tenant), or a lower privilege mode it sends the request to the client to modify its (host's) own share mode. The client grants the requests if there is no other active host with the requested privilege mode. If a host with the same share mode present in the ad-hoc network, the client will seek the permission from the host. The host may grant it while specifying new share mode for itself or reject it. If the host grants the permission, the client allows the requesting host to upgrade its share mode. Alternately, if a host with higher privilege (e.g. primary) mode intends to depart the ad-hoc network, it may send a request to the client to nominate another active host for the privileges it had. The client may select a host to assign these privileges based on predetermined criteria or by polling the all the active hosts within the ad-hoc network Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above, generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the presently claimed invention.

The various illustrative logical blocks, modules, and circuits described in connection with the aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EE-PROM), registers, hard disk, a removable disk, a CD-ROM, or any other form of storage medium known in the art. An exemplary storage medium is coupled to the processor such that the processor can read information from, and write information to the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the presently claimed invention. Various modifications to these aspects will be readily apparent to those skilled in the art, and the generic principles defined herein may be applied to other aspects without departing from the spirit or scope of the claimed invention. Thus, the presently claimed invention is not intended to be limited to the aspects shown herein, but is to be accorded the widest scope consistent with the principles and novel features disclosed herein.

The invention claimed is:

1. A method for sharing resources among at least two devices in a digital communication system, the method comprising:
    establishing a shared session;
    receiving a request to share a client resource from at least one active host in a first predetermined share mode;
    receiving a request to share the client resource from at least one inactive host in a second predetermined share mode;
    requesting permission from the at least one active host to share the client resource with the at least one inactive host;
    receiving a response to the request for permission from the at least one active host;
    sending a client resource allocation vector to the at least one active host and the at least one newly active host;
    allocating a first portion of the client resource to the at least one active host and a second portion of the client resource to the at least one newly active host; and
    negotiating the allocation with the at least one active host and the at least one newly active host, wherein the step of negotiating further comprises transferring of permissions and preferences.

2. The method of claim 1, further comprising maintaining the client resource allocation vector.

3. The method of claim 1, further comprising acknowledging the response to the at least one active host.

4. The method of claim 1, wherein the response comprises a rejection.

5. The method of claim 1, wherein the at least one active host, comprising at least one tenant, has a use of a full or partial client resource.

6. The method of claim 5, wherein the at least one tenant comprises a member from the group consisting of an exclusive use tenant, a primary tenant, a secondary tenant, a time sliced primary tenant, a time sliced secondary tenant and an equal share tenant.

7. The method of claim 5, wherein the at least one active host grants permission to the at least one inactive host, comprising the at least one tenant, to use the full or partial client resource.

8. The method of claim 5, wherein the at least one tenant relinquishes the permission.

9. The method of claim 1, further comprising updating the resource allocation vector.

10. The method of claim 9, wherein the updating occurs at predetermined instances.

11. The method of claim 1, wherein the client resource comprises a display.

12. The method of claim 11, wherein the client resource comprises a surface area of the display and a location on the display.

13. The method of claim 1, further comprising reallocating the client resource upon addition or subtraction of active and newly active hosts.

14. The method of claim 13, further comprising notifying the at least one active host of the reallocation.

15. The method of claims 1, wherein the response comprises a delayed start for using the client resource.

16. An apparatus for sharing resources among at least two devices in a digital communication system, comprising:
    means for establishing a shared session;
    means for receiving a request to share a client resource from at least one active host in a first predetermined share mode;
    means for receiving a request to share the client resource from at least one inactive host in a second predetermined share mode;
    means for requesting permission from the at least one active host to share the client resource with the at least one inactive host;
    means for receiving a response to the request for permission from the at least one active host;
    means for sending a client resource allocation vector to the at least one active host and the at least one newly active host;
    means for allocating a first portion of the client resource to the at least one active host and a second portion of the client resource to the at least one newly active host; and
    means for negotiating the allocation with the at least one active host and the at least one newly active host, wherein the means for negotiating further comprises means for transferring of permissions and preferences.

17. The apparatus of claim 16, further comprising a means for maintaining an allocation vector.

18. The apparatus of claim 16 further comprising a means for a acknowledging the sought permission to the at least one active host.

19. The system apparatus of claim 16, wherein the response comprises a rejection.

20. The system apparatus of claim 16, wherein the at least one active host, comprising at least one tenant, has a use of a full or partial client resource.

21. The apparatus of claim 20, wherein the at least one tenant comprises a member from the group consisting of an exclusive use tenant, a primary tenant, a secondary tenant, a time sliced primary tenant, a time sliced secondary tenant and an equal share tenant.

22. The system apparatus of claim 20, wherein the at least one active host grants permission to the at least one inactive host, comprising the at least one tenant, to use the full or partial client resource.

23. The system apparatus of claim 20, wherein the at least one tenant relinquishes the permission.

24. The system apparatus of claim 16, further comprising a means for updating the resource allocation vector.

25. The system apparatus of claim 24, wherein the means for updating is activated at predetermined instances.

26. The system of claim 16, wherein the client resource comprises a display.

27. The system of claim 16, wherein the client resource comprises a surface area of the display and a location on the display.

28. The system of claim 16, further comprising a means for reallocating the client resource upon addition or subtraction of active and newly active hosts.

29. The system of claim 28, further comprising a means for notifying the at least one active host of the reallocation.

30. The system of claims 16, wherein the response comprises a delayed start for using the client resource.

31. A non-transitory storage media comprising program instructions which are computer-executable to implement sharing of resources among at least two devices in a digital communication system, the storage media comprising:
    program instructions to establish a shared session;
    program instructions to receive request to share a client resource from at least one active host in a first predetermined share mode;
    program instructions to receive a request to share the client resource from at least one inactive host in a second predetermined share mode;
    program instructions to request permission from the at least one active host to share the client resource with the at least one inactive host;
    program instructions to receive a response to the request for permission from the at least one active host;
    program instructions to send a client resource allocation vector to the at least one active host and the at least one newly active host;
    program instructions to allocate a first portion of the client resource to the at least one active host and a second portion of the client resource to the at least one newly active host; and
    program instructions to negotiate the allocation with the at least one active host and the at least one newly active host, wherein the program instructions to negotiate further comprise program instructions to transfer permissions and preferences.

32. The storage media of claim 31, further comprising program instructions to maintain an allocation vector.

33. The storage media of claim 31, further comprising program instructions to acknowledge the response to the at least one active host.

34. The storage media of claim 31, wherein the response comprises a rejection.

35. The storage media of claim 31, wherein the at least one active host, comprising at least one tenant, has a use of a full or partial client resource.

36. The storage media of claim 35, wherein the at least one tenant comprises a member from the group consisting of an exclusive use tenant, a primary tenant, a secondary tenant, a time sliced primary tenant, a time sliced secondary tenant and an equal share tenant.

37. The storage media of claim 35, wherein the at least one active host grants permission to the at least one inactive host, comprising the at least one tenant, to use the full or partial client resource.

38. The storage media of claim 35, wherein the at least one tenant relinquishes the permission.

39. The storage media of claim 31, further comprising program instructions to update the resource allocation vector.

40. The storage media of claim 39, further comprising program instructions to update the resource allocation vector at predetermined instances.

41. The storage media of claim 31, wherein the client resource comprises a display.

42. The storage media of claim 41, wherein the client resource comprises a surface area of the display and a location on the display.

43. The storage media of claim 31, further comprising program instructions to reallocate the client resource upon addition or subtraction of active and newly active hosts.

44. The storage media of claim 43, further comprising program instructions to notify the at least one active host of the reallocation.

45. The storage media of claims 31, wherein the response comprises a delayed start for using the client resource.

46. A method for sharing resources among at least two devices in a digital communication system, the method comprising:
   establishing a shared session;
   requesting a client resource by a first host from a client in a first predetermined share mode;
   receiving a request for permission from the client to share the client resource with a next host;
   providing a response to the request for permission to the client;
   negotiating an allocation of the client resource with the next host, wherein the negotiating further comprises transferring of permissions and preferences; and
   receiving a client resource allocation vector from the client.

47. The method of claim 46, wherein the negotiating comprises negotiating between the first host and the next host brokered through the client.

48. The method of claim 46, wherein the negotiating comprises directly negotiating between the first host and the next host.

49. The method of claim 48, comprising sending information on the allocated first portion and the first host to the next host.

50. The method of claim 48, further comprising the providing an updated allocation vector to the client.

51. An apparatus for sharing resources among at least two devices in a digital communication system, comprising:
   means for establishing a shared session;
   means for requesting a client resource by a first host from a client in a first predetermined share mode;
   means for receiving a request for permission from the client to share the client resource with a next host;
   means for providing a response to the request for permission to the client;
   means for negotiating an allocation of the client resource with the next host, wherein the means for negotiating further comprises a means for transferring of permissions and preferences; and
   means for receiving a client resource allocation vector from the client.

52. The apparatus of claim 51, wherein the means for negotiating comprises a means for negotiating between the first host and the next host brokered through the client.

53. The apparatus of claim 51, wherein the means for negotiating comprises a means for directly negotiating between the first host and the next host.

54. The apparatus of claim 53, further comprising a means for sending information on the allocated first portion and the first host to the next host.

55. The apparatus of claim 53, further comprising a means for providing an updated allocation vector to the client.

56. A non-transitory storage media comprising program instructions which are computer-executable to implement sharing of resources among at least two devices in a digital communication system, the storage media comprising:
   program instructions to establish a shared session;
   program instructions to request a client resource by a first host from a client in a first predetermined share mode;
   program instructions to receive a request for permission from the client to share the client resource with a next host;
   program instructions to provide a response to the request for permission to the client;
   program instructions to negotiate an allocation of the client resource with the next host, wherein the program instructions to negotiate further comprise program instructions to transfer permissions and preferences; and
   program instructions to receive a client resource allocation vector from the client.

57. The storage media of claim 46, wherein the program instructions to negotiate comprise program instructions to negotiate between the first host and the next host brokered through the client.

58. The storage media of claim 46, wherein the program instructions to negotiate comprise program instructions to directly negotiate between the first host and the next host.

59. The storage media of claim 58, comprising program instructions to send information on the allocated first portion and the first host to the next host.

60. The storage media of claim 58, further comprising program instructions to provide an updated allocation vector to the client.

61. A method for sharing resources among at least two devices in a digital communication system, the method comprising:
   requesting a client resource from a client in a first predetermined share mode, wherein at least a first portion of the client resource is allocated to at least one active host;
   negotiating an allocation of the client resource, wherein the step of negotiating further comprises transferring of permissions and preferences;
   receiving an allocation of a second portion of the client resource from the client; and
   receiving a client resource allocation vector from the client.

62. The method of claim 61, wherein the negotiating comprises negotiating with the at least one active host brokered through the client.

63. The method of claim 61, wherein the negotiating comprises directly negotiating with the at least one active host.

64. The method of claim 63, further comprising acquiring information on the allocated first portion, the second portion, and the at least one active host.

65. An apparatus for sharing resources among at least two devices in a digital communication system, comprising:
   means for requesting a client resource from a client in a first predetermined share mode, wherein at least a first portion of the client resource is allocated to at least one active host;
   means for negotiating an allocation of the client resource, wherein the step of negotiating further comprises transferring of permissions and preferences;
   means for receiving an allocation of a second portion of the client resource from the client; and
   means for receiving a client resource allocation vector from the client.

66. The apparatus of claim 65, wherein the means for negotiating comprises means for negotiating with the at least one active host brokered through the client.

67. The apparatus of claim 65, wherein the means for negotiating comprises means for directly negotiating with the at least one active host.

68. The apparatus of claim 67, further comprising means for acquiring information on the allocated first portion, the second portion, and the at least one active host.

69. A non-transitory storage media comprising program instructions which are computer-executable to implement sharing of resources among at least two hosts in a digital communication system, the storage media comprising:
  program instructions to request a client resource in a first predetermined share mode, wherein at least a first portion of the client resource is allocated to at least one active host;
  program instructions to negotiate an allocation of the client resource, wherein the step of negotiating further comprises transferring of permissions and preferences;
  program instructions to receive an allocation of a second portion of the client resource from the client; and
  program instructions to receive a client resource allocation vector from the client.

70. The storage media of claim 69, wherein the program instructions to negotiate comprise program instructions to negotiate with the at least one active host brokered through the client.

71. The storage media of claim 69, wherein the program instructions to negotiate comprise program instructions to directly negotiate with the at least one active host.

72. The computer-readable storage media of claim 71, further comprising program instructions to acquire information on the allocated first portion, the second portion, and the at least one active host.

* * * * *